(12) United States Patent
Huang et al.

(10) Patent No.: US 11,169,423 B1
(45) Date of Patent: Nov. 9, 2021

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: Yaoli Huang, Wuhan (CN); Xinglong He, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/336,413

(22) PCT Filed: Nov. 7, 2018

(86) PCT No.: PCT/CN2018/114382
§ 371 (c)(1),
(2) Date: Mar. 25, 2019

(87) PCT Pub. No.: WO2020/042360
PCT Pub. Date: Mar. 5, 2020

(30) Foreign Application Priority Data

Aug. 31, 2018 (CN) .......................... 201811014513.2

(51) Int. Cl.
*G02F 1/136* (2006.01)
*G02F 1/1362* (2006.01)
*G06F 3/044* (2006.01)
*G06F 3/041* (2006.01)

(52) U.S. Cl.
CPC .. *G02F 1/136222* (2021.01); *G02F 1/136286* (2013.01); *G06F 3/0412* (2013.01); *G06F 3/0443* (2019.05)

(58) Field of Classification Search
CPC ......... G02F 1/136222; G02F 1/136286; G06F 3/0443; G06F 3/0412
USPC ............................................. 349/56
See application file for complete search history.

(56) References Cited

U.S. PATENT DOCUMENTS

| 2020/0042118 A1* | 2/2020 | Mugiraneza | ........ G06F 3/04166 |
| 2021/0143184 A1* | 5/2021 | Kawasaki | ................. G09F 9/30 |

FOREIGN PATENT DOCUMENTS

| CN | 102880325 A | 1/2013 |
| CN | 104777654 A | 7/2015 |
| CN | 105652498 A | 6/2016 |
| CN | 106371669 A | 2/2017 |
| CN | 104777654 B | * 3/2018 |

* cited by examiner

Primary Examiner — Nathanael R Briggs
Assistant Examiner — William D Peterson
(74) Attorney, Agent, or Firm — Kirton McConkie; Evan R. Witt

(57) ABSTRACT

The invention provides a display panel and a display device. An array substrate of the display panel includes signal transmission circuits and a control signal circuit. The signal transmission circuits include a first signal transmission circuit and a second signal transmission circuit in the circuit region. The second signal transmission circuit and the control signal circuit are disposed at the same layer. Therefore, there is no need to provide a hole for electrical connection between second signal transmission circuit and control signal circuit in the circuit region. The density of the holes in the circuit region is reduced.

20 Claims, 4 Drawing Sheets

DISPLAY PANEL AND DISPLAY DEVICE

BACKGROUND OF THE INVENTION

Field of Invention

The present invention relates to a liquid crystal display and more particularly to a display panel and a display device.

Description of Prior Art

At present, the self-capacitive display panel multiplexes the common electrode units into touch units by dividing the common electrode layer in the display panel into a plurality of common electrode units and by time-sharing driving, thereby further reducing the thickness of the display panel. At the same time, it also improves production efficiency and reduces production costs.

In the above display panel, the array substrate includes, in addition to the common electrode layer, a signal transmission circuit layer disposed in a different layer from the common electrode layer, and the signal transmission circuit layer includes a plurality of signal transmission circuits electrically connected to the common electrode units to provide a driving signal for each common electrode unit.

However, as shown in FIG. 1, in the display panel of the prior art, the signal transmission circuit layer of the circuit region is located at the outermost layer (M3 layer) of the array substrate, and the control signal circuit corresponding to the control chip is located at the innermost layer (M1 layer) of the array substrate. Therefore, it is necessary to provide a hole in the circuit region, resulting in a higher density of holes in the circuit region, which in turn cause the circuit region to be easily broken.

That is, the existing display panel has a technical problem that one needs to provide holes for electrical connection between signal transmission circuits and control signal circuits in the circuit region, however it causes the circuit region to be easily broken.

SUMMARY OF THE INVENTION

In view of the above, the present invention provides a display panel and a display device to solve the technical problem of easily broken circuit region came from providing holes for electrical connection between signal transmission circuits and control signal circuits in the circuit region.

In order to achieve above-mentioned object of the present invention, one embodiment of the present invention provides a display panel includes a color film substrate and an array substrate disposed opposite to the color film substrate.

The display panel includes a circuit region, a functional region and a frame region between the circuit region and the functional region. The display panel includes a liquid crystal layer disposed in a display region between the color film substrate and the array substrate. The display panel includes a sealant disposed in the frame region between the color film substrate and the array substrate, and a control chip disposed on the array substrate.

The array substrate includes a first substrate, a touch electrode layer, signal transmission circuits and a control signal circuit.

The touch electrode layer is disposed on a surface of the first substrate in the functional region and the touch electrode layer includes touch electrodes.

The signal transmission circuits connect to the touch electrodes, wherein the signal transmission circuits include a first signal transmission circuit in the functional region and a second signal transmission circuit in the circuit region.

The control signal circuit connects to the control chip.

The second signal transmission circuit and the control signal circuit are disposed at the same layer.

In one embodiment of the display panel of the present invention, the first signal transmission circuit and the second signal transmission circuit are disposed at different layers, the first signal transmission circuit electrically connects the second signal transmission circuit via a first hole, and the first hole is located in the functional region or the frame region.

In one embodiment of the display panel of the present invention, the first signal transmission circuit and the second signal transmission circuit are disposed at the same layer, the first signal transmission circuit electrically connects the touch electrode via a second hole, and the second hole is located in the functional region.

In one embodiment of the display panel of the present invention, the display panel further includes a gate layer and a source/drain layer disposed at different layers between the touch electrode layer and the first substrate.

In one embodiment of the display panel of the present invention, the first signal transmission circuit and the gate layer are at the same layer, and the first signal transmission circuit is electrically insulated from gate lines in the gate layer.

In one embodiment of the display panel of the present invention, the first signal transmission circuit and the source/drain layer are at the same layer, and the first signal transmission circuit is electrically insulated from source lines and drain lines in the source/drain layer.

In one embodiment of the display panel of the present invention, parts of the first signal transmission circuit and the gate layer are at the same layer, parts of the first signal transmission circuit and the source/drain layer are at the same layer, and the first signal transmission circuit is electrically insulated from gate lines in the gate layer and source lines and drain lines in the source/drain layer.

In one embodiment of the display panel of the present invention, the display panel further includes a pixel electrode layer at one side of the touch electrode layer opposite another side of the touch electrode layer facing the first substrate.

In one embodiment of the display panel of the present invention, the first signal transmission circuit and the pixel electrode layer are at the same layer, and the first signal transmission circuit is electrically insulated from the pixel electrodes in the pixel electrode layer.

In one embodiment of the display panel of the present invention, the first signal transmission circuit is disposed at one side of the pixel electrode layer opposite another side of the pixel electrode layer facing the touch electrode layer.

One embodiment of the present invention provides a display device including a backlight source, a display panel disposed on the backlight source, and a cover disposed on the display panel. The display panel includes a color film substrate, an array substrate disposed opposite to the color film substrate, a circuit region, a functional region and a frame region between the circuit region and the functional region. The display panel includes a liquid crystal layer disposed in a display region between the color film substrate and the array substrate. The display panel includes a sealant disposed in the frame region between the color film substrate and the array substrate. The display panel includes a control chip disposed on the array substrate.

The array substrate includes a first substrate.

The array substrate includes a touch electrode layer disposed on a surface of the first substrate in the functional region and the touch electrode layer includes touch electrodes.

The array substrate includes signal transmission circuits connected to the touch electrodes. The signal transmission circuits include a first signal transmission circuit in the functional region and a second signal transmission circuit in the circuit region.

The array substrate includes a control signal circuit connected to the control chip.

The second signal transmission circuit and the control signal circuit are disposed at the same layer.

In one embodiment of the display device of the present invention, the first signal transmission circuit and the second signal transmission circuit are disposed at different layers, the first signal transmission circuit electrically connects the second signal transmission circuit via a first hole, and the first hole is located in the functional region or the frame region.

In one embodiment of the display device of the present invention, the first signal transmission circuit and the second signal transmission circuit are disposed at the same layer, the first signal transmission circuit electrically connects the touch electrodes via a second hole, and the second hole is located in the functional region.

In one embodiment of the display device of the present invention, the display device further includes a gate layer and a source/drain layer disposed at different layers between the touch electrode layer and the first substrate.

In one embodiment of the display device of the present invention, the first signal transmission circuit and the gate layer are at the same layer, and the first signal transmission circuit is electrically insulated from gate lines in the gate layer.

In one embodiment of the display device of the present invention, wherein the first signal transmission circuit and the source/drain layer are at the same layer, and the first signal transmission circuit is electrically insulated from source lines and drain lines in the source/drain layer.

In one embodiment of the display device of the present invention, part of the first signal transmission circuit and the gate layer are at the same layer, part of the first signal transmission circuit and the source/drain layer are at the same layer, and the first signal transmission circuit is electrically insulated from gate lines in the gate layer and source lines and drain lines in the source drain layer.

In one embodiment of the display device of the present invention, the display device further includes a pixel electrode layer at one side of the touch electrode layer opposite another side of the touch electrode layer facing the first substrate.

In one embodiment of the display device of the present invention, the first signal transmission circuit and the pixel electrode layer are at the same layer, and the first signal transmission circuit is electrically insulated from pixel electrodes in the pixel electrode layer.

In one embodiment of the display device of the present invention, the first signal transmission circuit is disposed at one side of the pixel electrode layer opposite another side of the pixel electrode layer facing the touch electrode layer.

The application provides a display panel and a display device. The array substrate of the display panel includes a first substrate, a touch electrode layer disposed on a surface of the first substrate in the functional region, and signal transmission circuits connected to the touch electrodes. The signal transmission circuits include a first signal transmission circuit in the functional region and a second signal transmission circuit in the circuit region. A control signal circuit connected to the control chip. The second signal transmission circuit and the control signal circuit are disposed at the same layer. Therefore, there is no need to provide a hole for electrical connection between second signal transmission circuit and control signal circuit in the circuit region. The density of the holes in the circuit region is reduced, and the toughness of the circuit region is ensured. The technical problem of easy breakage in the circuit region of the prior art display panel is solved.

DETAILED DESCRIPTION OF THE PREFERRED EMBODIMENTS

The following description of the embodiments is provided by reference to the following drawings and illustrates the specific embodiments of the present invention. Directional terms mentioned in the present invention, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Figure 1:
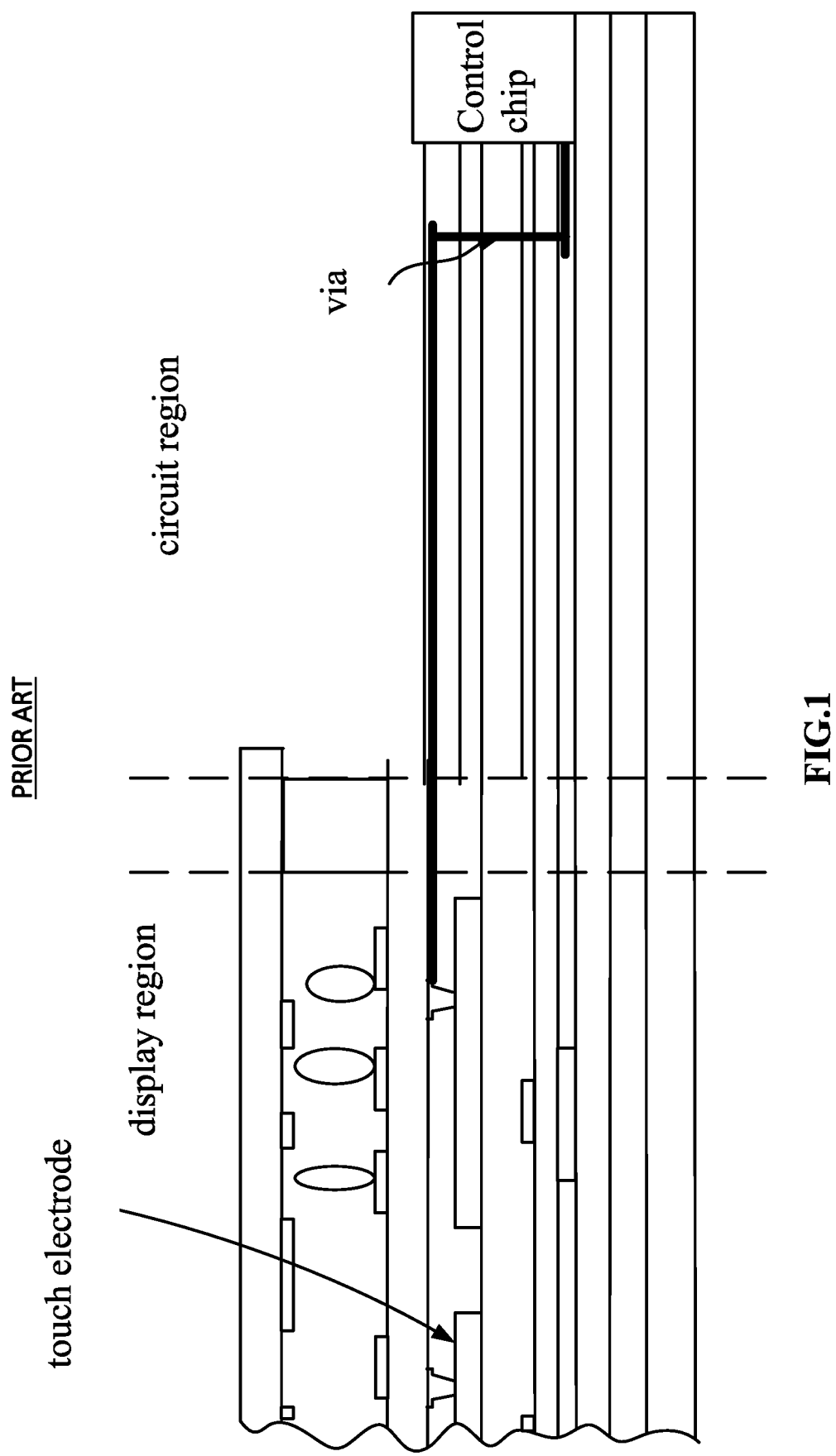
FIG. 1 is a schematic diagram showing the prior art display panel.
Figure 3:
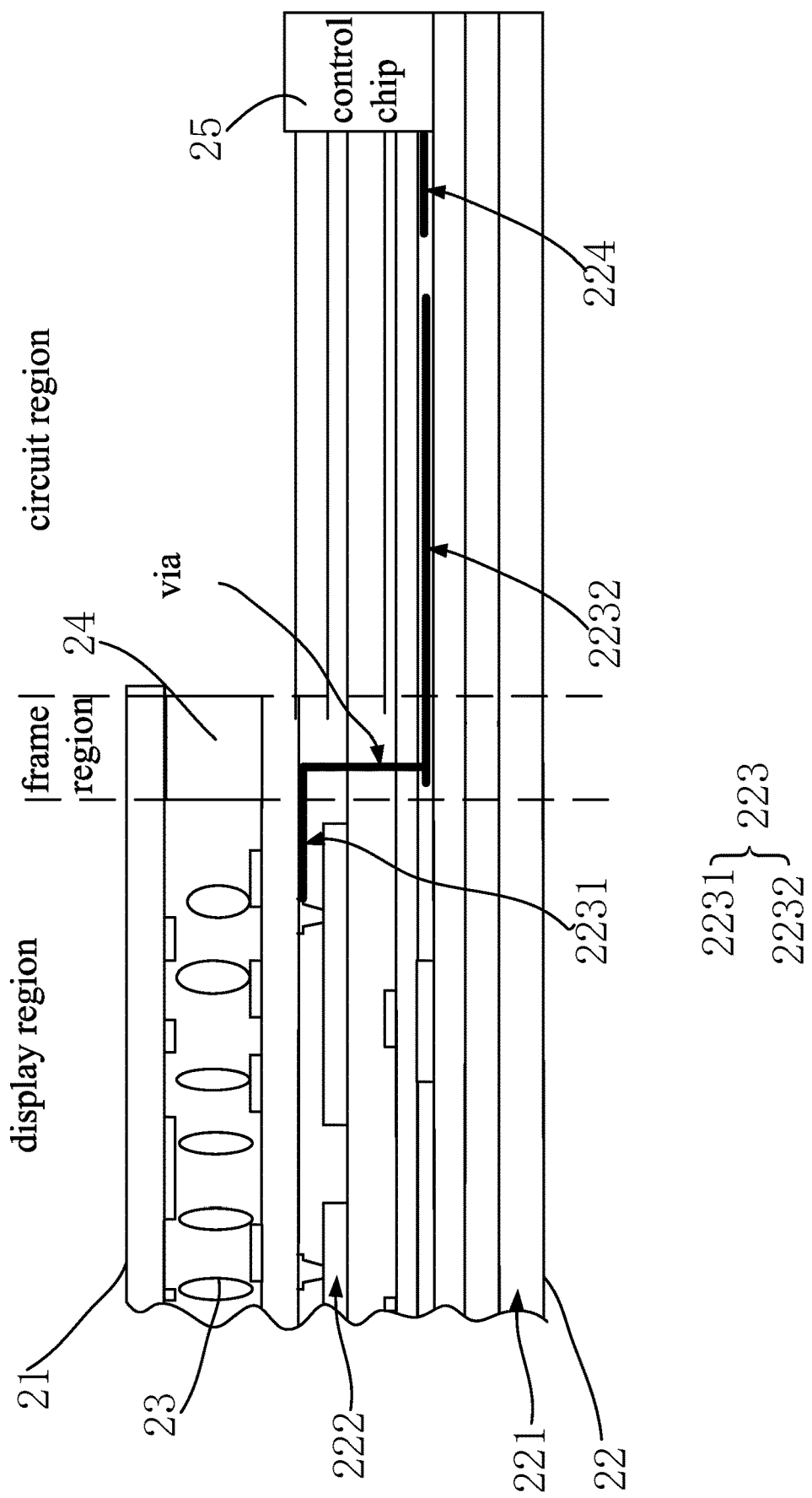
FIG. 3 is a schematic diagram of a display panel according to another embodiment of the present invention.
Figure 4:
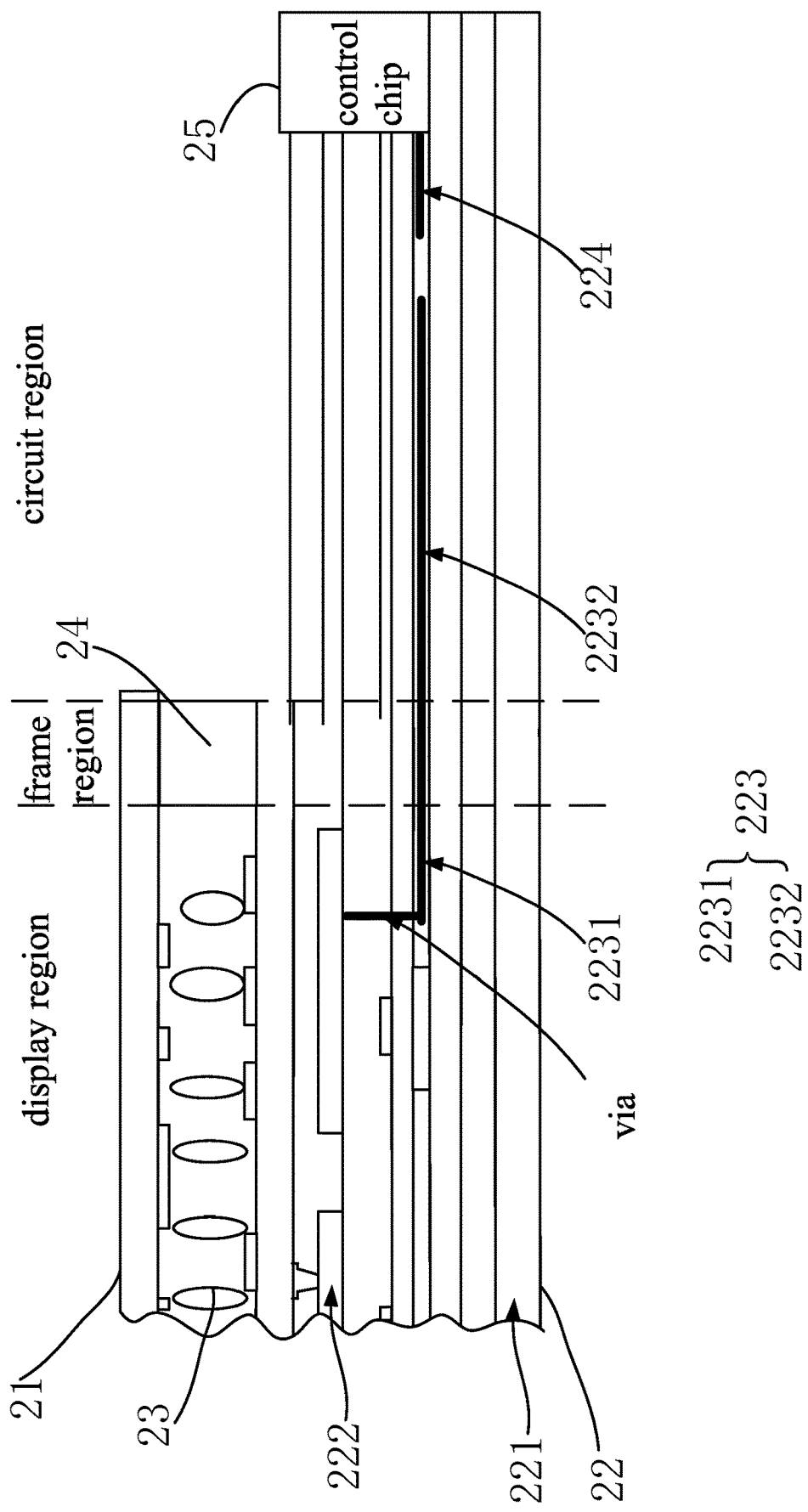
FIG. 4 is a schematic diagram of a display according to still another embodiment of the present invention.

For the prior art display panel shown in FIG. 1, there is a technical problem that it is required to provide a via-hole for electrical connection between signal transmission circuit and a control signal circuit in the circuit region, and the circuit region is easily broken. The present application as shown in FIG. 2 to FIG. 4 is capable of solving this drawback.

Figure 2:
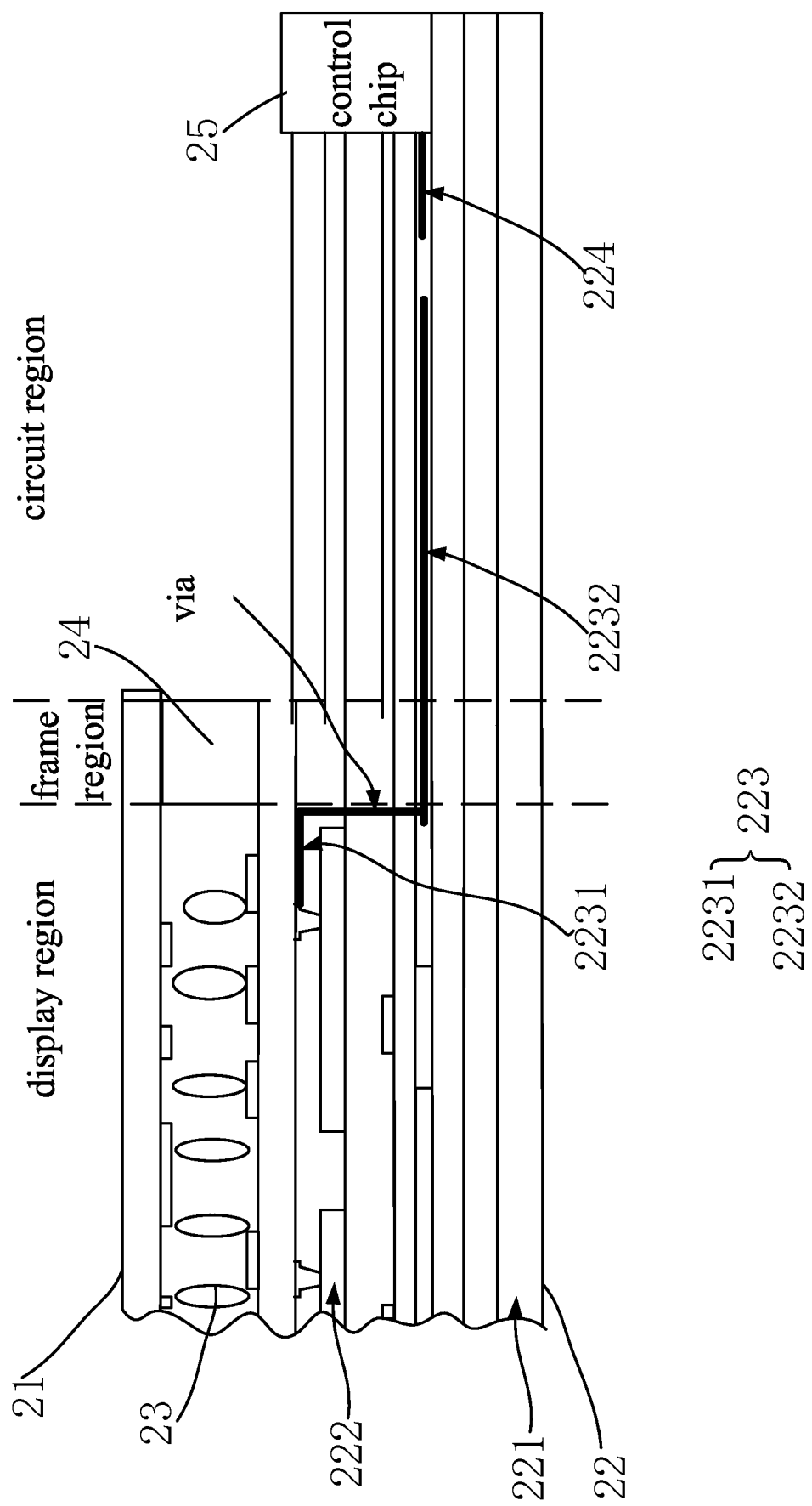
FIG. 2 is a schematic diagram of a display panel according to one embodiment of the present invention.

As shown in FIG. 2, the present invention provides a display panel includes a color film substrate 21 and an array substrate 22 disposed opposite to the color film substrate 21. The display panel includes a circuit region, a functional region and a frame region between the circuit region and the functional region. The display panel includes a liquid crystal layer 23 disposed in a display region between the color film substrate 21 and the array substrate 22. The display panel includes a sealant 24 disposed in the frame region between the color film substrate 21 and the array substrate 22, and a control chip 25 disposed on the array substrate 22.

The array substrate 22 includes a first substrate 221, a touch electrode layer 222, signal transmission circuits 223, and a control signal circuit 224.

The touch electrode layer 222 is disposed on a surface of the first substrate 221 in the functional region and the touch electrode layer 222 includes touch electrodes.

The signal transmission circuits 223 connect to the touch electrodes, wherein the signal transmission circuits 223 include a first signal transmission circuit 2231 in the functional region and a second signal transmission circuit 2232 in the circuit region.

The control signal circuit 224 connects to the control chip 25.

The second signal transmission circuit 2232 and the control signal circuit 224 are disposed at the same layer.

In one embodiment of the display panel of the present invention, as shown in FIG. 2, the first signal transmission circuit 2231 and the second signal transmission circuit 2232 are disposed at different layers, the first signal transmission circuit 2231 electrically connects the second signal transmission circuit 2232 via a first hole, and the first hole is located in the functional region.

In one embodiment of the display panel of the present invention, as shown in FIG. 3, the first signal transmission circuit 2231 and the second signal transmission circuit 2232 are disposed at different layers, the first signal transmission circuit 2231 electrically connects the second signal transmission circuit 2232 via a first hole, and the first hole is located in the frame region.

In one embodiment of the display panel of the present invention, as shown in FIG. 4, the first signal transmission circuit 2231 and the second signal transmission circuit 2232 are disposed at the same layer, the first signal transmission circuit 2231 electrically connects the touch electrodes via a second hole, and the second hole is located in the functional region.

In one embodiment of the display panel of the present invention, the display panel further includes a gate layer and a source/drain layer disposed at different layers between the touch electrode layer and the first substrate. Specifically, as shown in FIG. 2, there is provided with a gate layer (M1 layer) in a display region between the first substrate and the touch electrode layer. The gate layer includes a plurality of gate lines. The gate lines are covered by an insulating layer. The insulating layer and the display region of the touch electrode layer are provided with a source/drain layer (M2 layer). The source/drain layer includes a plurality of source lines and drain lines. An insulating layer is disposed between the source/drain layer and the common electrode layer.

In one embodiment of the display panel of the present invention, the first signal transmission circuit and the gate layer are at the same layer, and the first signal transmission circuit is electrically insulated from gate lines in the gate layer in order to reduce the thickness of the array substrate. In one embodiment of the display panel of the present invention, the material of the first signal transmission circuit and the material of the electrode of the gate lines are the same. So, that in the manufacturing process of the array substrate, the first signal transmission circuit and the gate lines can be formed in the same process to shorten the process flow of the array substrate, and to reduce the manufacturing cost of the array substrate.

In one embodiment of the display panel of the present invention, the first signal transmission circuit and the source/drain layer are at the same layer, and the first signal transmission circuit is electrically insulated from source lines and drain lines in the source/drain layer in order to reduce the thickness of the array substrate. In one embodiment of the display panel of the present invention, the material of the first signal transmission circuit and the material of the electrode of source lines and drain lines are the same. So, that in the manufacturing process of the array substrate, the first signal transmission circuit, the source lines and the drain lines can be formed in the same process to shorten the process flow of the array substrate, and to reduce the manufacturing cost of the array substrate.

In one embodiment of the display panel of the present invention, parts of the first signal transmission circuit and the gate layer are at the same layer, parts of the first signal transmission circuit and the source/drain layer are at the same layer, and the first signal transmission circuit is electrically insulated from gate lines in the gate layer and source lines and drain lines in the source/drain layer. It reduces the thickness of the array substrate and reduces the manufacturing cost of the array substrate. The first signal transmission circuit is disposed at different layers to reduce the area occupation of the first signal transmission in the circuit region of the array substrate with the same wiring pitch. On the other hand, adding the wiring pitch between the adjacent first signal transmission circuits with the same area occupation to reduce the crosstalk between adjacent first signal transmission circuits.

In one embodiment of the display panel of the present invention, the first signal transmission circuit is disposed at one side of the touch electrode layer opposite another side of the touch electrode layer facing the first substrate. The second signal transmission circuit is disposed at the side of the touch electrode layer facing the first substrate. The first signal transmission circuit electrically connects directly with the second signal transmission circuit via a hole. In another embodiment of the present invention, the array substrate further includes a connecting circuit. The first signal transmission circuit electrically connects the connecting circuit via a hole, and the second signal transmission circuit electrically connects the connecting circuit via the hole.

In one embodiment of the present invention, the connecting circuit and the touch electrode layer are at the same layer to reduce the thickness of the array substrate. In one embodiment of the present invention, the material of the connecting circuit is the same with the material of the electrode of the touch electrode in order to forming the connecting circuit and the touch electrode at the same process to shorten the process flow of the array substrate and reduce the manufacturing cost of the array substrate.

In one embodiment of the display panel of the present invention, the display panel further includes a pixel electrode layer at one side of the touch electrode layer opposite another side of the touch electrode layer facing the first substrate.

In one embodiment of the display panel of the present invention, the first signal transmission circuit and the pixel electrode layer are at the same layer, and the first signal transmission circuit is electrically insulated from the pixel electrodes in the pixel electrode layer.

In one embodiment of the display panel of the present invention, the first signal transmission circuit is disposed at one side of the pixel electrode layer opposite another side of the pixel electrode layer facing the touch electrode layer.

One embodiment of the present invention provides a display device including a backlight source, a display panel disposed on the backlight source, and a cover disposed on the display panel. The display panel includes a color film substrate 21, an array substrate 22 disposed opposite to the color film substrate 21. The display panel includes a circuit region, a functional region and a frame region between the circuit region and the functional region. The display panel includes a liquid crystal layer 23 disposed in a display region between the color film substrate 21 and the array substrate 22. The display panel includes a sealant 24 disposed in the frame region between the color film substrate 21 and the array substrate 22. The display panel includes a control chip 25 disposed on the array substrate 22.

The array substrate 22 includes a first substrate 221.

The array substrate 22 includes a touch electrode layer 222 disposed on a surface of the first substrate 221 in the functional region and the touch electrode layer 222 includes touch electrodes.

The array substrate 22 includes signal transmission circuits 223 connected to the touch electrodes. The signal transmission circuits 223 include a first signal transmission circuit 2231 in the functional region and a second signal transmission circuit 2232 in the circuit region.

The array substrate 22 includes a control signal circuit 224 connected to the control chip 25.

The second signal transmission circuit 2232 and the control signal circuit 224 are disposed at the same layer.

In one embodiment of the display device of the present invention, as shown in FIG. 2, the first signal transmission circuit 2231 and the second signal transmission circuit 2232 are disposed at different layers, the first signal transmission circuit 2231 electrically connects the second signal transmission circuit 2232 via a first hole, and the first hole is located in the functional region.

In one embodiment of the display device of the present invention, as shown in FIG. 3, the first signal transmission circuit 2231 and the second signal transmission circuit 2232 are disposed at different layers, the first signal transmission circuit 2231 electrically connects the second signal transmission circuit 2232 via a first hole, and the first hole is located in the frame region.

In one embodiment of the display device of the present invention, as shown in FIG. 4, the first signal transmission circuit 2231 and the second signal transmission circuit 2232 are disposed at the same layer, the first signal transmission circuit 2231 electrically connects the touch electrodes via a second hole, and the second hole is located in the functional region.

In one embodiment of the display device of the present invention, the display panel further includes a gate layer and a source/drain layer disposed at different layers between the touch electrode layer and the first substrate. Specifically, as shown in FIG. 2, there is provided with a gate layer (M1 layer) in a display region between the first substrate and the touch electrode layer. The gate layer includes a plurality of gate lines. The gate lines are covered by an insulating layer. The insulating layer and the display region of the touch electrode layer are provided with a source/drain layer (M2 layer). The source/drain layer includes a plurality of source lines and drain lines. An insulating layer is disposed between the source/drain layer and the common electrode layer.

In one embodiment of the display device of the present invention, the first signal transmission circuit and the gate layer are at the same layer, and the first signal transmission circuit is electrically insulated from gate lines in the gate layer in order to reduce the thickness of the array substrate. In one embodiment of the display panel of the present invention, the material of the first signal transmission circuit and the material of the electrode of the gate lines are the same. So, that in the manufacturing process of the array substrate, the first signal transmission circuit and the gate lines can be formed in the same process to shorten the process flow of the array substrate, and to reduce the manufacturing cost of the array substrate.

In one embodiment of the display device of the present invention, the first signal transmission circuit and the source/drain layer are at the same layer, and the first signal transmission circuit is electrically insulated from source lines and drain lines in the source/drain layer in order to reduce the thickness of the array substrate. In one embodiment of the display panel of the present invention, the material of the first signal transmission circuit and the material of the electrode of the source lines and drain lines are the same. So, that in the manufacturing process of the array substrate, the first signal transmission circuit, the source lines and the drain lines can be formed in the same process to shorten the process flow of the array substrate, and to reduce the manufacturing cost of the array substrate.

In one embodiment of the display device of the present invention, parts of the first signal transmission circuit and the gate layer are at the same layer, parts of the first signal transmission circuit and the source/drain layer are at the same layer, and the first signal transmission circuit is electrically insulated from gate lines in the gate layer and source lines and drain lines in the source/drain layer. It reduces the thickness of the array substrate and reduces the manufacturing cost of the array substrate. The first signal transmission circuit is disposed at different layers to reduce the area occupation of the first signal transmission in the circuit region of the array substrate with the same wiring pitch. On the other hand, adding the wiring pitch between the adjacent first signal transmission circuits with the same area occupation to reduce the crosstalk between adjacent first signal transmission circuits.

In one embodiment of the display device of the present invention, the first signal transmission circuit is disposed at one side of the touch electrode layer opposite another side of the touch electrode layer facing the first substrate. The second signal transmission circuit is disposed at the side of the touch electrode layer facing the first substrate. The first signal transmission circuit electrically connects directly with the second signal transmission circuit via a hole. In another embodiment of the present invention, the array substrate further includes a connecting circuit. The first signal transmission circuit electrically connects the connecting circuit via a hole, and the second signal transmission circuit electrically connects the connecting circuit via the hole.

In one embodiment of the present invention, the connecting circuit and the touch electrode layer are at the same layer to reduce the thickness of the array substrate. In one embodiment of the present invention, the material of the connecting circuit is the same with the material of the electrode of the touch electrode in order to forming the connecting circuit and the touch electrode at the same process to shorten the process flow of the array substrate and reduce the manufacturing cost of the array substrate.

In one embodiment of the display device of the present invention, the display device further includes a pixel electrode layer at one side of the touch electrode layer opposite another side of the touch electrode layer facing the first substrate.

In one embodiment of the display device of the present invention, the first signal transmission circuit and the pixel electrode layer are at the same layer, and the first signal transmission circuit is electrically insulated from pixel electrodes in the pixel electrode layer.

In one embodiment of the display device of the present invention, the first signal transmission circuit is disposed at one side of the pixel electrode layer opposite another side of the pixel electrode layer facing the touch electrode layer.

The application provides a display panel and a display device. The array substrate of the display panel includes a first substrate, a touch electrode layer disposed on a surface of the first substrate in the functional region, and signal transmission circuits connected to the touch electrodes. The signal transmission circuits include a first signal transmission circuit in the functional region and a second signal transmission circuit in the circuit region. A control signal circuit connected to the control chip. The second signal transmission circuit and the control signal circuit are disposed at the same layer. Therefore, there is no need to provide a hole for electrical connection between second signal transmission circuit and control signal circuit in the circuit region. The density of the holes in the circuit region is reduced, and the toughness of the circuit region is ensured. The technical problem of easy breakage in the circuit region of the prior art display panel is solved.

The present invention has been described by the above embodiments, but the embodiments are merely examples for implementing the present invention. It must be noted that the embodiments do not limit the scope of the invention. In contrast, modifications and equivalent arrangements are intended to be included within the scope of the invention.

What is claimed is:

1. A display panel, comprising:
a color film substrate;
an array substrate disposed opposite to the color film substrate;
a circuit region, a functional region and a frame region between the circuit region and the functional region;
a liquid crystal layer disposed in a display region between the color film substrate and the array substrate;
a sealant disposed in the frame region between the color film substrate and the array substrate; and
a control chip disposed on the array substrate, wherein the array substrate comprises:
a first substrate;
a touch electrode layer disposed on a surface of the first substrate in the functional region and the touch electrode layer comprising touch electrodes;
signal transmission circuits connected to the touch electrodes, wherein the signal transmission circuits comprise a first signal transmission circuit in the functional region and a second signal transmission circuit in the circuit region; and
a control signal circuit connected to the control chip, wherein the second signal transmission circuit and the control signal circuit are disposed at the same layer.

2. The display panel as claimed in claim 1, wherein the first signal transmission circuit and the second signal transmission circuit are disposed at different layers, the first signal transmission circuit electrically connects the second signal transmission circuit via a first hole, and the first hole is located in the functional region or the frame region.

3. The display panel as claimed in claim 1, wherein the first signal transmission circuit and the second signal transmission circuit are disposed at the same layer, the first signal transmission circuit electrically connects the touch electrodes via a second hole, and the second hole is located in the functional region.

4. The display panel as claimed in claim 1, further comprising a gate layer and a source/drain layer disposed at different layers between the touch electrode layer and the first substrate.

5. The display panel as claimed in claim 4, wherein the first signal transmission circuit and the gate layer are at the same layer, and the first signal transmission circuit is electrically insulated from gate lines in the gate layer.

6. The display panel as claimed in claim 4, wherein the first signal transmission circuit and the source/drain layer are at the same layer, and the first signal transmission circuit is electrically insulated from source lines and drain lines in the source/drain layer.

7. The display panel as claimed in claim 4, wherein parts of the first signal transmission circuit and the gate layer are at the same layer, parts of the first signal transmission circuit and the source/drain layer are at the same layer, and the first signal transmission circuit is electrically insulated from gate lines in the gate layer and source lines and drain lines in the source/drain layer.

8. The display panel as claimed in claim 1, further comprising a pixel electrode layer at one side of the touch electrode layer opposite another side of the touch electrode layer facing the first substrate.

9. The display panel as claimed in claim 8, wherein the first signal transmission circuit and the pixel electrode layer are at the same layer, and the first signal transmission circuit is electrically insulated from the pixel electrodes in the pixel electrode layer.

10. The display panel as claimed in claim 8, wherein the first signal transmission circuit is disposed at one side of the pixel electrode layer opposite another side of the pixel electrode layer facing the touch electrode layer.

11. A display device, comprising:
a backlight source;
a display panel disposed on the backlight source; and
a cover disposed on the display panel, wherein the display panel comprises:
a color film substrate;
an array substrate disposed opposite to the color film substrate;
a circuit region, a functional region and a frame region between the circuit region and the functional region;
a liquid crystal layer disposed in a display region between the color film substrate and the array substrate;
a sealant disposed in the frame region between the color film substrate and the array substrate; and
a control chip disposed on the array substrate, wherein the array substrate comprises:
a first substrate;
a touch electrode layer disposed on a surface of the first substrate in the functional region and the touch electrode layer comprising touch electrodes;
signal transmission circuits connected to the touch electrodes, wherein the signal transmission circuits comprise a first signal transmission circuit in the functional region and a second signal transmission circuit in the circuit region; and
a control signal circuit connected to the control chip, wherein the second signal transmission circuit and the control signal circuit are disposed at the same layer.

12. The display device as claimed in claim 11, wherein the first signal transmission circuit and the second signal transmission circuit are disposed at different layers, the first signal transmission circuit electrically connects the second signal transmission circuit via a first hole, and the first hole is located in the functional region or the frame region.

13. The display device as claimed in claim 11, wherein the first signal transmission circuit and the second signal transmission circuit are disposed at the same layer, the first signal transmission circuit electrically connects the touch electrodes via a second hole, and the second hole is located in the functional region.

14. The display device as claimed in claim 11, further comprising a gate layer and a source/drain layer disposed at different layers between the touch electrode layer and the first substrate.

15. The display device as claimed in claim 14, wherein the first signal transmission circuit and the gate layer are at the same layer, and the first signal transmission circuit is electrically insulated from gate lines in the gate layer.

16. The display device as claimed in claim 14, wherein the first signal transmission circuit and the source/drain layer are at the same layer, and the first signal transmission circuit is electrically insulated from source lines and drain lines in the source/drain layer.

17. The display device as claimed in claim 14, wherein part of the first signal transmission circuit and the gate layer are at the same layer, part of the first signal transmission circuit and the source/drain layer are at the same layer, and the first signal transmission circuit is electrically insulated from gate lines in the gate layer and source lines and drain lines in the source drain layer.

18. The display device as claimed in claim 11, further comprising a pixel electrode layer at one side of the touch electrode layer opposite another side of the touch electrode layer facing the first substrate.

19. The display device as claimed in claim 18, wherein the first signal transmission circuit and the pixel electrode layer are at the same layer, and the first signal transmission circuit is electrically insulated from the pixel electrodes in the pixel electrode layer.

20. The display device as claimed in claim 18, wherein the first signal transmission circuit is disposed at one side of the pixel electrode layer opposite another side of the pixel electrode layer facing the touch electrode layer.

* * * * *